(12) United States Patent
Khanafer et al.

(10) Patent No.: US 11,403,338 B2
(45) Date of Patent: Aug. 2, 2022

(54) DATA MODULE CREATION FROM IMAGES

(71) Applicant: International Business Machines Corporation, Armonk, NY (US)

(72) Inventors: Ali Khanafer, Ottawa (CA); Mohammed Mostafa, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 16/810,190

(22) Filed: Mar. 5, 2020

(65) Prior Publication Data

US 2021/0279271 A1  Sep. 9, 2021

(51) Int. Cl.
*G06F 16/51* (2019.01)
*G06F 16/583* (2019.01)
*G06T 7/162* (2017.01)
*G06T 7/13* (2017.01)

(52) U.S. Cl.
CPC .......... *G06F 16/51* (2019.01); *G06F 16/5854* (2019.01); *G06T 7/13* (2017.01); *G06T 7/162* (2017.01)

(58) Field of Classification Search
None
See application file for complete search history.

(56) References Cited

U.S. PATENT DOCUMENTS

| | | | |
|---|---|---|---|
| 9,064,147 B2 | 6/2015 | Ouyang | |
| 9,495,347 B2 | 11/2016 | Stadermann | |
| 10,169,378 B2 | 1/2019 | Sassin | |
| 10,410,386 B2 | 9/2019 | Bellert | |
| 10,430,393 B2 | 10/2019 | Horner | |
| 2004/0090439 A1 | 5/2004 | Dillner | |
| 2016/0342709 A1* | 11/2016 | Fokoue-Nkoutche | G06F 16/9024 |
| 2020/0250453 A1* | 8/2020 | Gupta | G06F 3/04845 |
| 2020/0334878 A1* | 10/2020 | Tailang | G06K 9/3233 |
| 2021/0097054 A1* | 4/2021 | Carter | G06F 16/2365 |

* cited by examiner

*Primary Examiner* — Giuseppi Giuliani
(74) *Attorney, Agent, or Firm* — Vanleeuwen & Vanleeuwen; Alexander G. Jochym (57) ABSTRACT

An approach is provided in which the approach performs object detection on an image to identify a set of edges and a set of tables from a set of objects corresponding to a set of data. The approach determines a set of associations between the set of tables and the set of edges in response to adjusting a set of bounding boxes corresponding to the set of edges. The approach generates a data module based on the set of associations, the set of tables, and the set of edges, and utilizes the data module to access the set of data.

20 Claims, 8 Drawing Sheets

DATA MODULE CREATION FROM IMAGES

BACKGROUND

Business intelligence (BI) includes strategies and technologies for data analysis of business information and provides historical, current, and predictive views of business operations. Common functions of business intelligence include reporting, online analytical processing, analytics, data mining, process mining, complex event processing, business performance management, benchmarking, text mining, predictive analytics, and prescriptive analytics.

Business intelligence systems use data modeling to define and analyze data requirements needed to support business processes within the scope of organizational information systems. Data modules include data from data servers, uploaded files, data sets, other data modules, and from relational, dynamic query mode packages. Business intelligence systems use the data modules as sources for reports, dashboards, stories, explorations, notebooks, data sets, and other data modules.

During a design phase with today's business intelligence systems, a developer organizes data into tables and accounts for access, performance and storage details. The developer then generates a diagram describing the connections (edges) between the various tables, the cardinality of the connections (one-to-many, many-to-many, etc.), the keys used for the connections, and then manually creates a data module based on the diagram.

BRIEF SUMMARY

According to one embodiment of the present disclosure, an approach is provided in which the approach performs object detection on an image to identify a set of edges and a set of tables from a set of objects corresponding to a set of data. The approach determines a set of associations between the set of tables and the set of edges in response to adjusting a set of bounding boxes corresponding to the set of edges. The approach generates a data module based on the set of associations, the set of tables, and the set of edges, and utilizes the data module to access the set of data.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
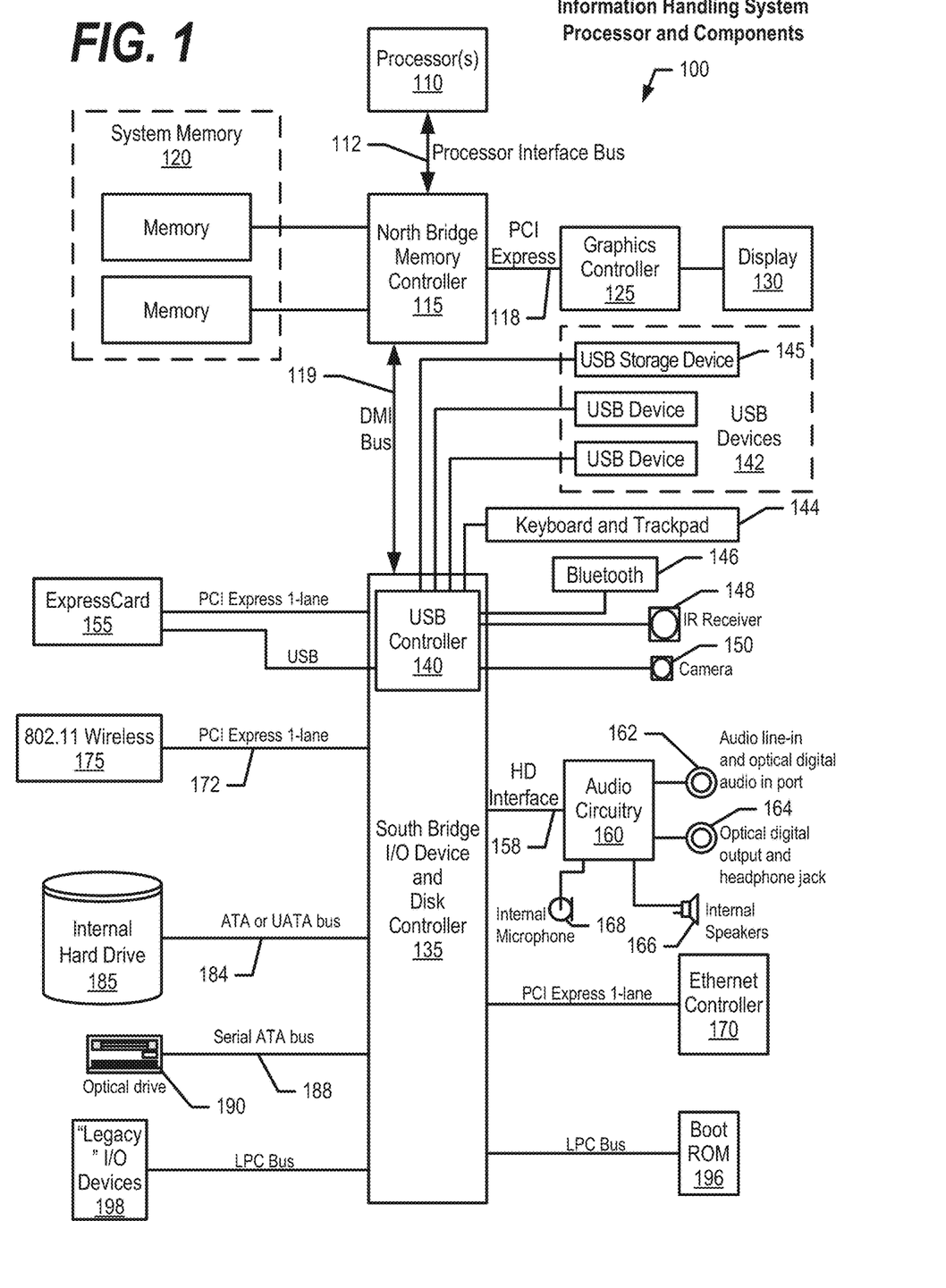
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
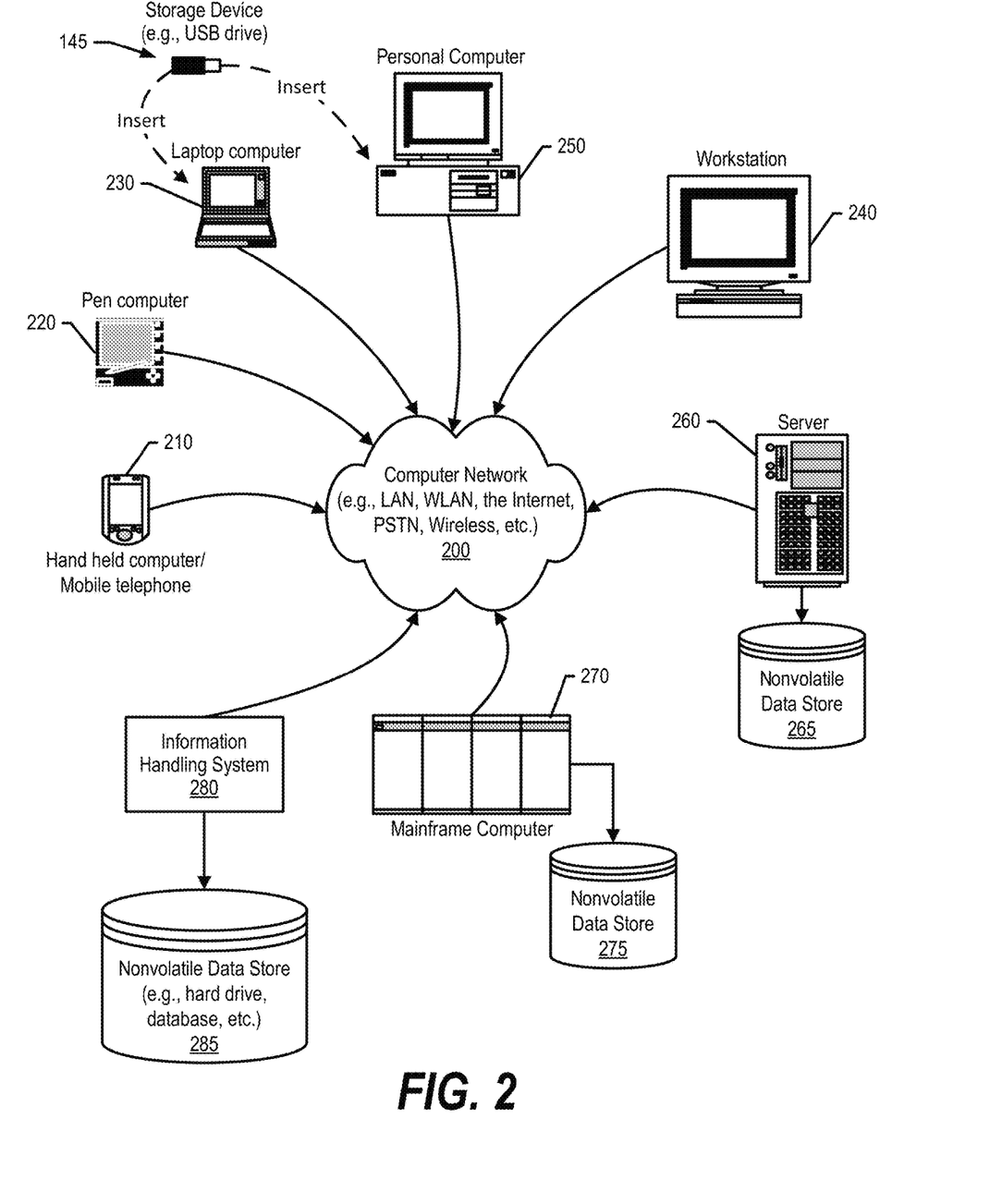
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, a developer manually creates data modules from diagram drawings during the design phase. Unfortunately, the developer typically revises the diagrams during the development cycle, which results in a repetitive and time-consuming process. FIGS. 3 through 8 depict an approach that can be executed on an information handling system that automatically creates data modules from input images. The approach receives an input image of a database diagram or an entity relation diagram (ERD) and generates a JSON (JavaScript Object Notation) file describing the entities (tables) and joins (edges) in the diagram. The approach then uses the generated JSON file to automatically create a data module for use by business analytics systems. As discussed herein, data modules are source objects that contain data from data servers; uploaded files; or other data modules.

Figure 3:
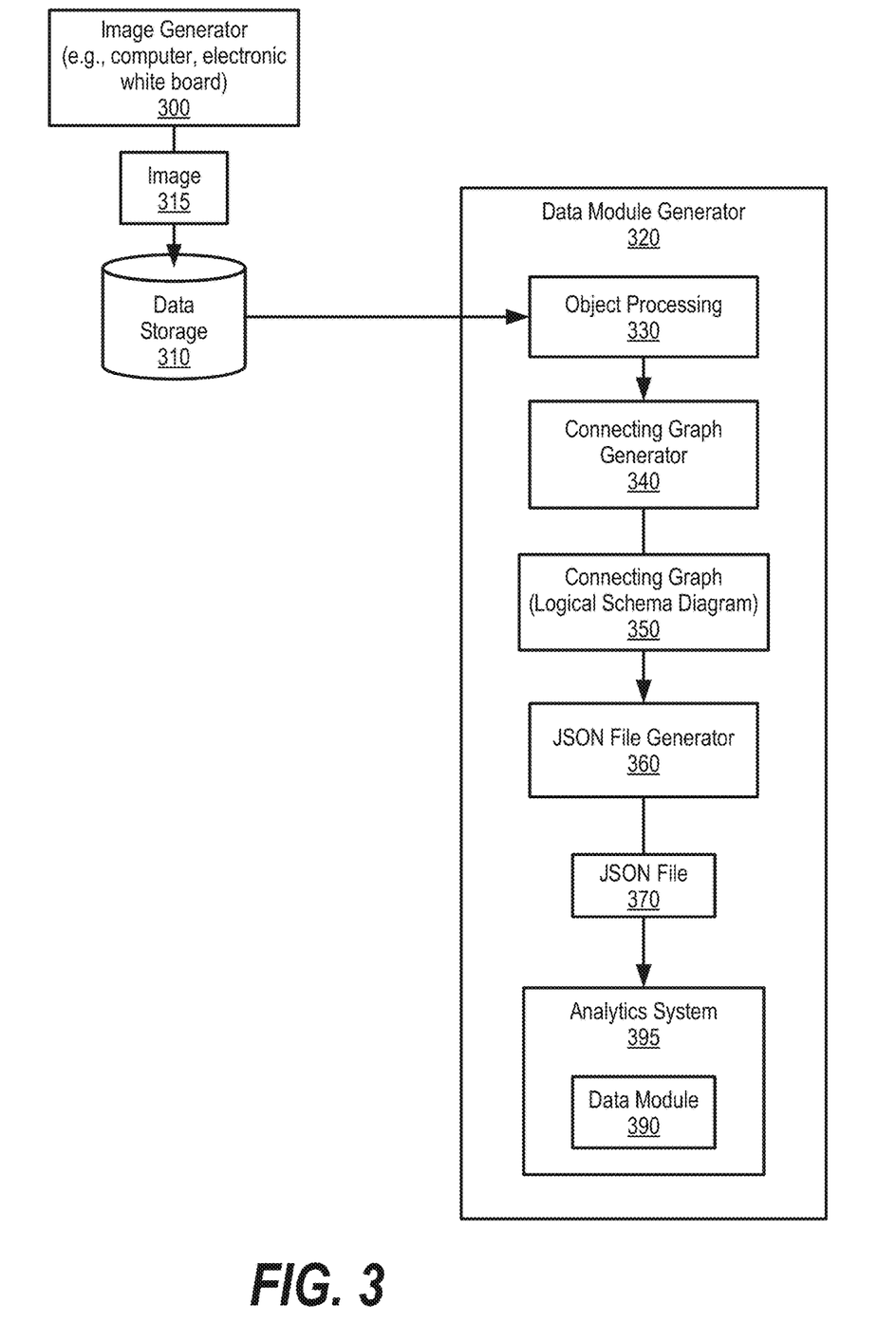
FIG. 3 is an exemplary high-level diagram depicting a data module generator transforming an image to a data module.

FIG. 3 is an exemplary high-level diagram depicting a data module generator transforming an image to a data module. Image generator 300 creates images (image 315) and stores the images in data storage 310. Image generator 300 may be a computer system using a software program, an electronic whiteboard that captures a user's hand drawn sketches, a scanner, or any other mechanism to digitally capture an image.

Data module generator 320 retrieves image 315 and performs object processing on image 315 to format image 315 for further processing. Object processing 330 may include resizing image 315, converting image 315 to greyscale, performing object detection, and performing optical character recognition (see FIG. 5 and corresponding text for further details).

Connecting graph generator 340 receives the formatted image 315 from object processing 330 and performs steps to identify and associate formatted image 315's various objects to each other. In particular, after object processing 330 groups the objects into tables and edges, connecting graph generator 340 uses a bounding box algorithm to vary the sizes of the edges' bounding boxes and identify overlapping table bounding boxes. Connecting graph 350 computes the areas of intersections of the overlapping bounding boxes and generates connecting graph 350 (see FIGS. 6, 7, and corresponding text for further details). In one embodiment, connecting graph 350 is a logical schema diagram that describes a specific problem domain independently of a particular database management product or storage technology in terms of data structures such as relational tables and columns, object-oriented classes, or XML tags.

Figure 8:
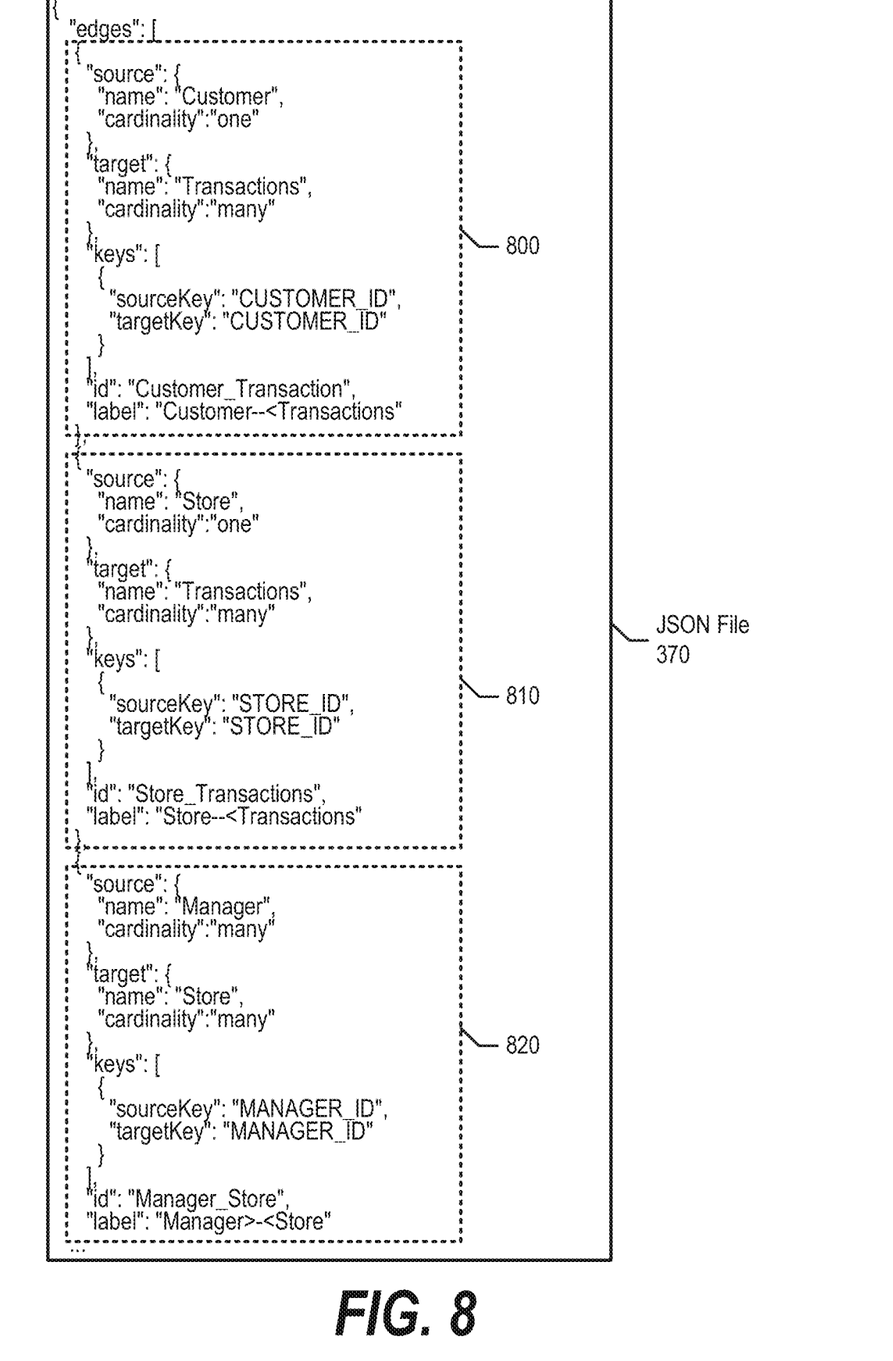
FIG. 8 is an exemplary diagram depicting a portion of a JSON file generated from a connecting graph.

JSON file generator 360 receives connecting graph 350 and generates JSON file 370, which describes the tables, edges, and associations an open-standard file format or data interchange format that uses human-readable text to transmit data objects consisting of attribute-value pairs and array data types (see FIG. 8 and corresponding text for further details).

Analytics system 395 then creates data module 390 from JSON file 370. In one embodiment, analytics system 395 exposes a public endpoint that allows a user to submit a JSON file describing the data module desired. If such endpoint is not available, translating the JSON file to the corresponding language understood by analytics system 395 product is straightforward as the JSON file contains all the required information. In another embodiment, a data module creator receives JSON file 370, creates data module 390, and provides data module 390 to analytics system 395.

Figure 4:
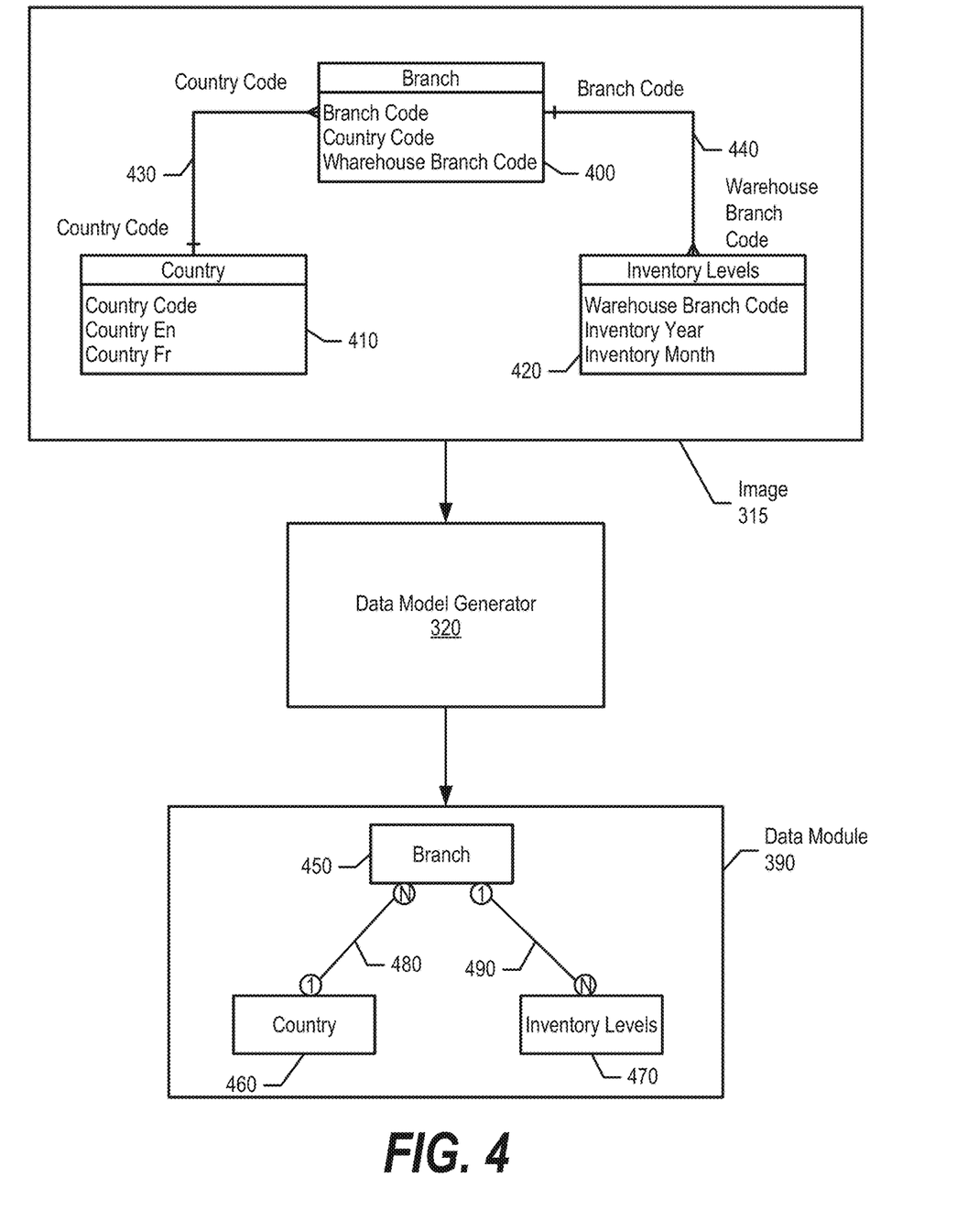
FIG. 4 is an exemplary diagram depicting a data module generator transforming an image into a data module.

FIG. 4 is an exemplary diagram depicting a data module generator transforming an image into a data module. Image 315 includes objects 400, 410, 420, 430, and 440. Data model generator 320 formats image 315 via object processing 330 and organizes objects 400 through 440 into tables (400, 410, 420) and edges (430, 440).

Figure 7:
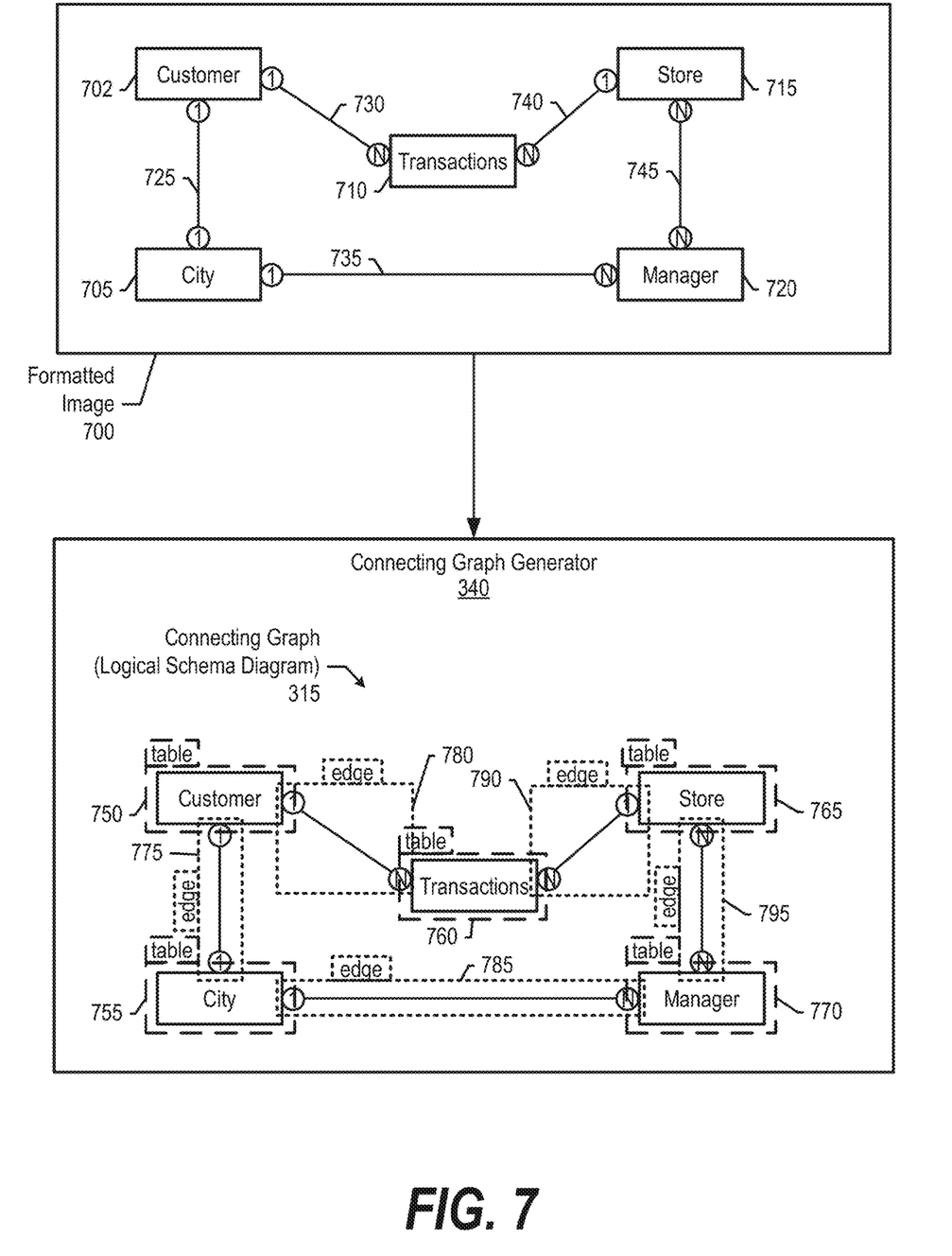
FIG. 7 is an exemplary diagram depicting a connecting graph generator processing a preprocessed image.

Next, data model generator 320 uses a bounding box algorithm to expand bounding boxes that correspond to the edges and identifies table bounding boxes that overlap the expanded edge bounding boxes (see FIG. 7 and corresponding text for further details). Data model generator 320 then creates connecting graph 350 that links (joins) the tables together through their corresponding edges.

Next, data model generator 320 creates JSON file 370 from connecting graph 350 that describes the tables, edges, and associations in an open-standard file format or data interchange format (see FIG. 8 and corresponding text for further details). In turn, data model generator 320 generates data module 390 from JSON file 370 that includes tables 450, 460, and 470, which are joined by edges 480 and 490. In one embodiment, data model generator 320 generates data model 390 using the bounding box information without creating JSON file 370.

Figure 5:
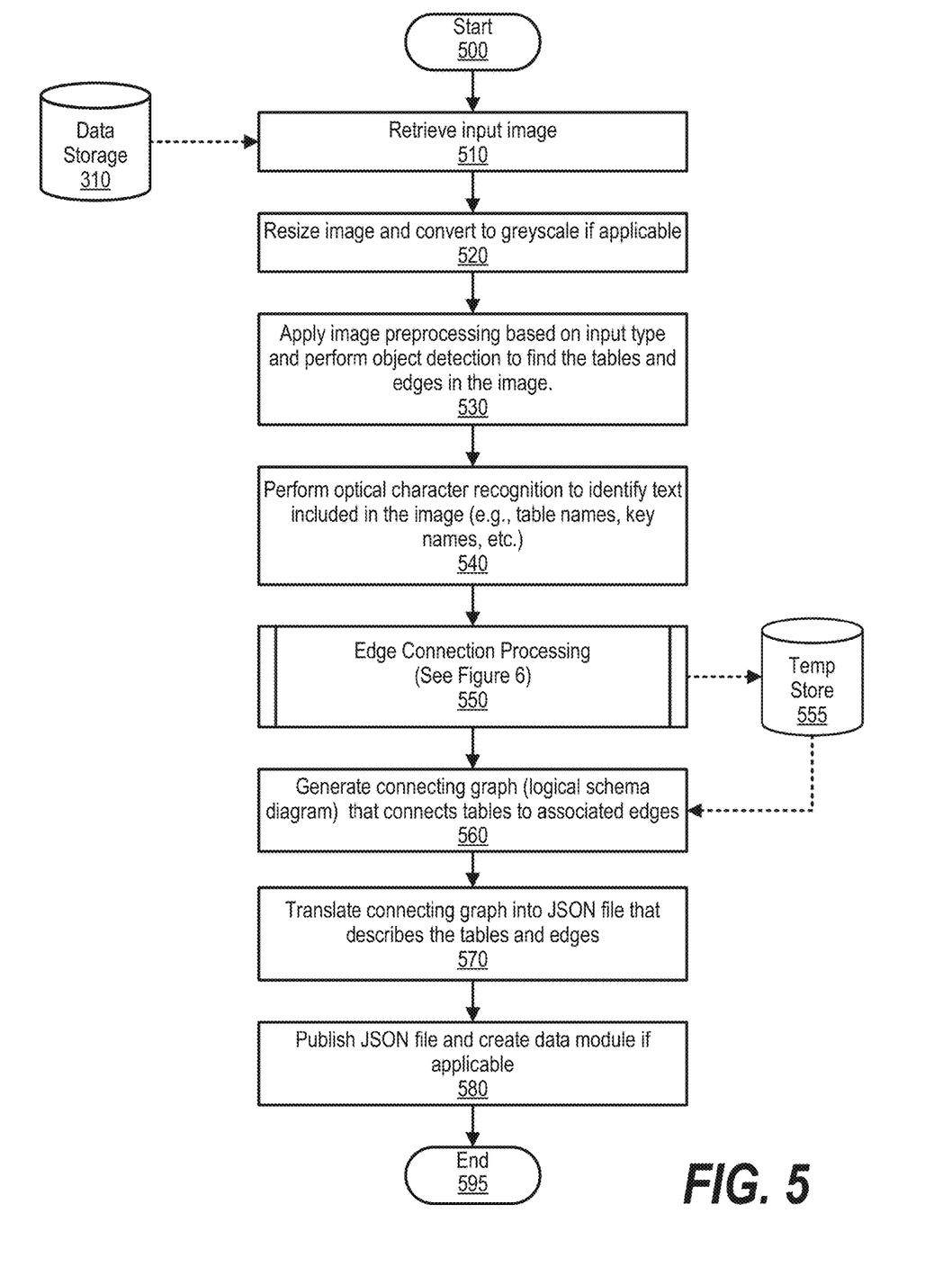
FIG. 5 is an exemplary flowchart showing steps taken to transform an image into a data module.

FIG. 5 is an exemplary flowchart showing steps taken to transform an image into a data module. FIG. 5 processing commences at 500 whereupon, at step 510, the process retrieves image 315 from data storage 310. At step 520, the process resizes image 315 and converts image 315 to greyscale if applicable.

At step 530, the process applies image preprocessing based on image 315's input type and performs object detection to find the tables and edges in image 315. For example, the process may perform an additional step for hand drawn images to convert the hand drawn images to objects such as rectangles and lines. In one embodiment, the process uses object detection to also detect cardinality symbols on either side of the edges (1, N, etc.) (see FIG. 7 and corresponding text for further details).

At step 540, the process performs optical character recognition on image 315 to identify text included in the image (e.g., table names, key names, etc.). At predefined process 550, the process associates the edges to the tables using expanding bounding box techniques (see FIG. 6 and corresponding text for processing details). The process stores the associations in temp store 555.

At step 560, the process generates connecting graph 350 (e.g., a logical schema diagram) that connects the tables to the associated edges based on the associations stored in temp store 555. At step 570, the process translates connecting graph 350 into JSON file 370 that describes the tables, edges, and associations in an open-standard file format or data interchange format. In one embodiment, the process generates JSON file 370 from connecting graph 315 by traversing the graph and translating each of the entities (nodes, edges) into JSON objects (see FIG. 8 and corresponding text for further details). At step 580, the process publishes JSON file 370 and creates data module 390 as described herein. FIG. 5 processing thereafter ends at 595.

Figure 6:
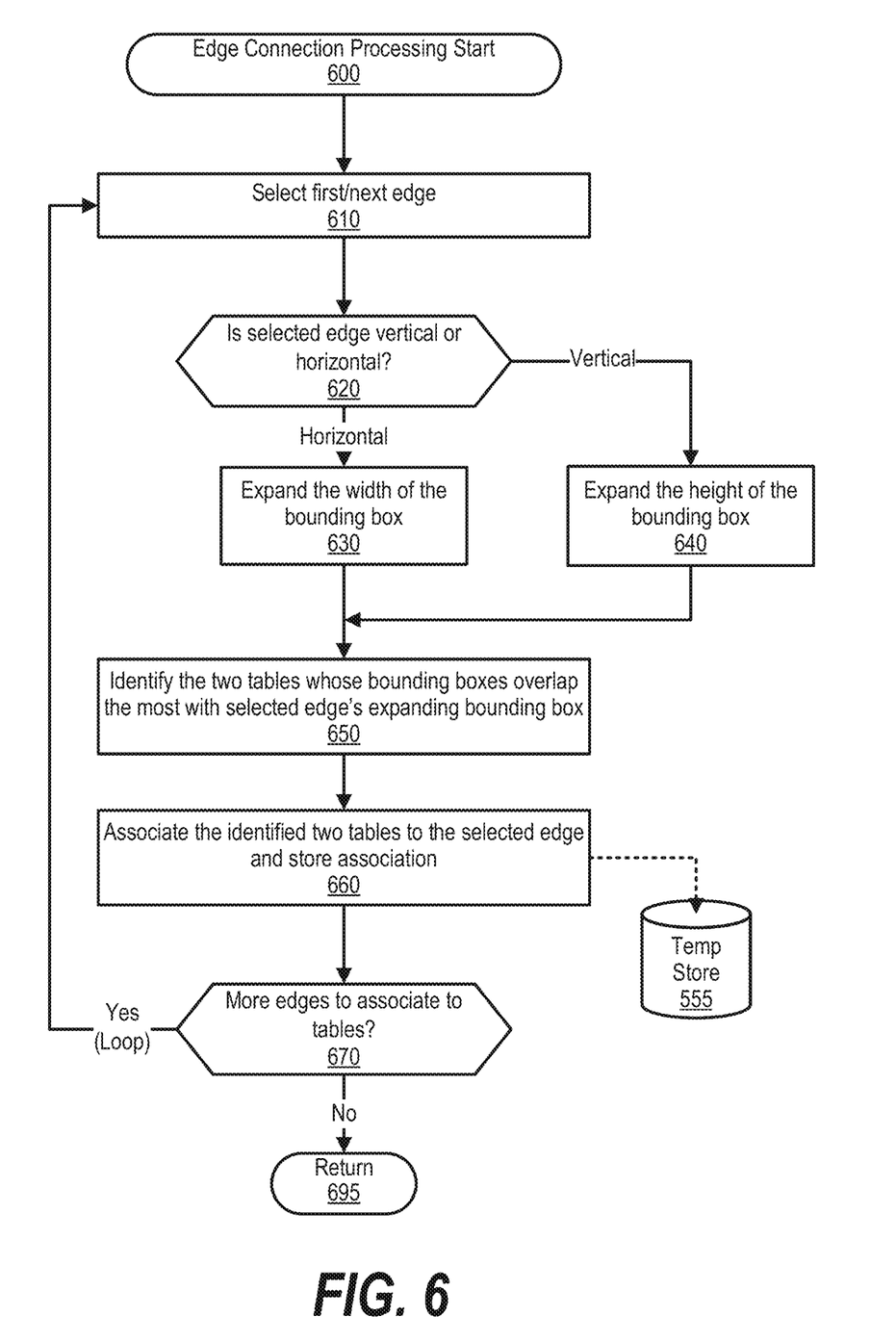
FIG. 6 is an exemplary flowchart showing steps taken to expand edge bounding boxes and associate edges to tables.

FIG. 6 is an exemplary flowchart showing steps taken to expand edge bounding boxes and associate edges to tables. FIG. 6 processing commences at 600 whereupon, at step 610, the process selects an edge identified in FIG. 5's step 530. The process determines as to whether the edge is positioned vertically or horizontally (decision 620). In one embodiment, for angled edges, the process knows that an edge is at an angle if the bounding box is almost square. In this embodiment, the process expands the bounding box both horizontally and vertically to detect the most overlap with adjacent bounding boxes.

If the selected edge is positioned horizontally, decision 620 branches to the "horizontal" branch whereupon the process expands the width of the bounding box at step 630 until the process detects two overlapping table bounding boxes (see FIG. 7 and corresponding text for further details).

On the other hand, if the selected edge is positioned vertically, then decision 620 branches to the "vertical" branch whereupon the process expands the height of the bounding box at step 640 until the process detects two overlapping table bounding boxes. In one embodiment, the process expands the bounding box in both a vertical and horizontal direction at a scale consistent with the angle of the edge. For example, if the edge is at a 30 degree angle, the process expands the bounding box in 2:1 horizontal/vertical scale until the process detects two overlapping table bounding boxes.

At step 650, the process identifies the two tables whose bounding boxes overlap the most with selected edge's expanding bounding box. At step 660, the process associates the identified two tables to the selected edge and stores the association in temporary store 555.

The process determines as to whether there are more edges to associate to tables (decision 670). If there are more edges to associate to tables, then decision 670 branches to the 'yes' branch which loops back to select and process the next edge. This looping continues until there are no more edges to process, at which point decision 670 branches to the 'no' branch exiting the loop. FIG. 6 processing thereafter returns to the calling routine (see FIG. 5) at 695.

FIG. 7 is an exemplary diagram depicting a connecting graph generator processing a formatted image. Formatted image 700 is image 315 after object processing 330, which includes resizing, grayscale adjustments, object detection, and optical character recognition of image 315. Formatted image 700 includes identified tables 702, 705, 710, 715, and 720. Preprocessed image 700 also includes identified edges 725, 730, 735, 740, and 745. Connecting graph generator 340 evaluates formatted image 700 and associates (links) the edges to the tables by expanding edge bounding boxes to identify overlaps in table bounding boxes as described below.

Connecting graph generator 340 begins by expanding bounding box 775 (corresponding to edge 725) in a vertical direction and determines that bounding box 775 overlaps with bounding box 750 and 755. As such, connecting graph generator 340 associates edge 725 to tables 702 (bounding box 750's table) and 705 (bounding box 755's table). In the example shown in FIG. 7, the bounding boxes for each of the edges also encompass the cardinality symbols at the end of the edges (e.g., 1, N). As discussed herein, data model generator 320 uses object detection to tag the cardinality symbols. In one embodiment, image 315 includes the join keys (primary and/or secondary), such as join keys for edge 430 shown in FIG. 4 ("Branch," "Country Code" and "Country," "Country Code"). Data model generator 320 uses object detection to detect the join keys in image 315 and uses optical character recognition to identify the text associated with the join keys.

Connecting graph generator 340 selects the next edge and expands bounding box 785 (corresponding to edge 735) in a horizontal direction and determines that bounding box 785 overlaps with bounding box 755 and 770. As such, connecting graph generator 340 associates edge 735 to tables 705 and 720.

Connecting graph generator 340 expands bounding box 780 (corresponding to edge 730) in a horizontal/vertical direction and determines that bounding box 780 overlaps with bounding box 750 and 760. As such, connecting graph generator 340 associates edge 730 to tables 702 and 710.

Connecting graph generator 340 expands bounding box 790 (corresponding to edge 740) in a horizontal/vertical direction and determines that bounding box 790 overlaps with bounding box 760 and 765. As such, connecting graph generator 340 associates edge 740 to tables 710 and 715.

Connecting graph generator 340 expands bounding box 795 (corresponding to edge 745) in a vertical direction and determines that bounding box 795 overlaps with bounding box 765 and 770. As such, connecting graph generator 340 associates edge 745 to tables 715 and 720.

FIG. 8 is an exemplary diagram depicting a portion of a JSON file generated from a connecting graph. JSON file 370 shown in FIG. 8 is a portion of JSON file 370 generated from connecting graph 315 shown in FIG. 7. The approach described herein generates JSON file 370 from connecting graph 315 by traversing the graph and translating all the entities (nodes, edges) into JSON objects. Code 800 describes edge 730, code 810 describes edge 740, and code 820 describes edge 745.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    performing object detection on an image of a diagram comprising a plurality of objects corresponding to a set of data, wherein the object detection identifies the plurality of objects as a set of data tables comprising the set of data and a set of edges that connect the set of data tables, and wherein the set of edges comprise one or more cardinality symbols;
    determining a set of associations between the set of tables and the set of edges in response to adjusting a set of bounding boxes corresponding to the set of edges;
    generating a data module based on the set of associations, the set of tables, and the set of edges comprising the one or more cardinality symbols; and
    utilizing the data module to access the set of data.

2. The method of claim 1 further comprising:
    determining an orientation of a selected one of the set of edges based on a set of dimensions of a selected one of the set of bounding boxes;
    in response to determining that the selected edge is a horizontal edge, adjusting a width of the selected bounding box;
    identifying a first table bounding box and a second table bounding box that overlap the adjusted bounding box, wherein the first table bounding box corresponds to a first one of the set of tables and the second table bounding box corresponds to a second one of the set of tables; and
    associating the first table and the second table to the selected edge.

3. The method of claim 2 further comprising:
    adjusting a height of the adjusted bounding box in response to determining that the adjusted bounding box fails to overlap the first table bounding box and the second table bounding box; and
    continuing to expand the width of the adjusted bounding box and the height of the adjusted bounding box until the adjusted bounding box overlaps the first table bounding box and the second table bounding box.

4. The method of claim 1 further comprising:
    creating a connecting graph based on the determined set of associations;
    translating the connecting graph into a JSON file; and
    utilizing the JSON file to generate the data module.

5. The method of claim 4 wherein the connecting graph is a logical schema diagram.

6. The method of claim 4 wherein each of the one or more cardinality symbols indicate a relationship selected from the group consisting of a one-to-one cardinality, a one-to-many cardinality, and a many-to-many cardinality.

7. The method of claim 4 wherein an analytics system converts the JSON file into the data module, and wherein the analytics system utilizes the data module to access the set of data.

8. An information handling system comprising:
one or more processors;
a memory coupled to at least one of the processors;
a set of computer program instructions stored in the memory and executed by at least one of the processors in order to perform actions of:
performing object detection on an image of a diagram comprising a plurality of objects corresponding to a set of data, wherein the object detection identifies the plurality of objects as a set of data tables comprising the set of data and a set of edges that connect the set of data tables, and wherein the set of edges comprise one or more cardinality symbols;
determining a set of associations between the set of tables and the set of edges in response to adjusting a set of bounding boxes corresponding to the set of edges;
generating a data module based on the set of associations, the set of tables, and the set of edges comprising the one or more cardinality symbols; and
utilizing the data module to access the set of data.

9. The information handling system of claim 8 wherein the processors perform additional actions comprising:
determining an orientation of a selected one of the set of edges based on a set of dimensions of a selected one of the set of bounding boxes;
in response to determining that the selected edge is a horizontal edge, adjusting a width of the selected bounding box;
identifying a first table bounding box and a second table bounding box that overlap the adjusted bounding box, wherein the first table bounding box corresponds to a first one of the set of tables and the second table bounding box corresponds to a second one of the set of tables; and
associating the first table and the second table to the selected edge.

10. The information handling system of claim 9 wherein the processors perform additional actions comprising:
adjusting a height of the adjusted bounding box in response to determining that the adjusted bounding box fails to overlap the first table bounding box and the second table bounding box; and
continuing to expand the width of the adjusted bounding box and the height of the adjusted bounding box until the adjusted bounding box overlaps the first table bounding box and the second table bounding box.

11. The information handling system of claim 8 wherein the processors perform additional actions comprising:
creating a connecting graph based on the determined set of associations;
translating the connecting graph into a JSON file; and
utilizing the JSON file to generate the data module.

12. The information handling system of claim 11 wherein the connecting graph is a logical schema diagram.

13. The information handling system of claim 11 wherein each the one or more cardinality symbols indicate a relationship selected from the group consisting of a one-to-one cardinality, a one-to-many cardinality, and a many-to-many cardinality.

14. The information handling system of claim 11 wherein an analytics system converts the JSON file into the data module, and wherein the analytics system utilizes the data module to access the set of data.

15. A computer program product stored in a computer readable storage medium, comprising computer program code that, when executed by an information handling system, causes the information handling system to perform actions comprising:
performing object detection on an image of a diagram comprising a plurality of objects corresponding to a set of data, wherein the object detection identifies the plurality of objects as a set of data tables comprising the set of data and a set of edges that connect the set of data tables, and wherein the set of edges comprise one or more cardinality symbols;
determining a set of associations between the set of tables and the set of edges in response to adjusting a set of bounding boxes corresponding to the set of edges;
generating a data module based on the set of associations, the set of tables, and the set of edges comprising the one or more cardinality symbols; and
utilizing the data module to access the set of data.

16. The computer program product of claim 15 wherein the information handling system performs further actions comprising:
determining an orientation of a selected one of the set of edges based on a set of dimensions of a selected one of the set of bounding boxes;
in response to determining that the selected edge is a horizontal edge, adjusting a width of the selected bounding box;
identifying a first table bounding box and a second table bounding box that overlap the adjusted bounding box, wherein the first table bounding box corresponds to a first one of the set of tables and the second table bounding box corresponds to a second one of the set of tables; and
associating the first table and the second table to the selected edge.

17. The computer program product of claim 16 wherein the information handling system performs further actions comprising:
adjusting a height of the adjusted bounding box in response to determining that the adjusted bounding box fails to overlap the first table bounding box and the second table bounding box; and
continuing to expand the width of the adjusted bounding box and the height of the adjusted bounding box until the adjusted bounding box overlaps the first table bounding box and the second table bounding box.

18. The computer program product of claim 15 wherein the information handling system performs further actions comprising:
creating a connecting graph based on the determined set of associations;
translating the connecting graph into a JSON file; and
utilizing the JSON file to generate the data module.

19. The computer program product of claim 18 wherein the connecting graph is a logical schema diagram.

20. The computer program product of claim 18 wherein each of the one or more cardinality symbols indicate a relationship selected from the group consisting of a one-to-one cardinality, a one-to-many cardinality, and a many-to-many cardinality.

\* \* \* \* \*